US011762448B1

(12) United States Patent
Fang

(10) Patent No.: US 11,762,448 B1
(45) Date of Patent: Sep. 19, 2023

(54) METHOD FOR TROUBLESHOOTING ABNORMAL SENSOR IN ENERGY-STORAGE APPARATUS, TERMINAL DEVICE, AND STORAGE MEDIUM

(71) Applicants: Shenzhen Hithium Energy Storage Control Technology Co., Ltd., Guangdong (CN); Xiamen Hithium Energy Storage Technology Co., Ltd., Fujian (CN)

(72) Inventor: Yizhong Fang, Guangdong (CN)

(73) Assignees: Shenzhen Hithium Energy Storage Control Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/326,506

(22) Filed: May 31, 2023

(30) Foreign Application Priority Data

Nov. 4, 2022 (CN) .......................... 202211375011.9

(51) Int. Cl.
*G06F 1/3212* (2019.01)
(52) U.S. Cl.
CPC ................................. *G06F 1/3212* (2013.01)
(58) Field of Classification Search
CPC ..................................................... G06F 1/3212
See application file for complete search history.

(56) References Cited

U.S. PATENT DOCUMENTS

| 11,708,005 B2 * | 7/2023 | Nguyen | B60L 58/10 |
| | | | 320/118 |
| 2017/0331157 A1 * | 11/2017 | Newman | H01M 10/425 |
| 2021/0096633 A1 * | 4/2021 | Rintamaeki | G05B 17/02 |
| 2021/0184282 A1 * | 6/2021 | Sarfert | H01M 10/486 |
| 2021/0249639 A1 * | 8/2021 | Shao | H01M 10/486 |
| 2021/0359523 A1 * | 11/2021 | Ritchey | H02M 7/66 |
| 2022/0065940 A1 * | 3/2022 | Sudarsan | G01R 31/392 |
| 2022/0158269 A1 * | 5/2022 | Pettersson | H01M 10/6568 |

OTHER PUBLICATIONS

CNIPA, Office Action for Chinese Patent Application No. 202211375011.9, dated Dec. 13, 2022, 9 pages.
CNIPA, Notice of Allowance for Chinese Patent Application No. 202211375011.9, dated Dec. 29, 2022, 3 pages.

* cited by examiner

*Primary Examiner* — Aurel Prifti
(74) *Attorney, Agent, or Firm* — IP Spring

(57) ABSTRACT

A method for troubleshooting an abnormal sensor in an energy-storage apparatus, a terminal device, and storage medium are provided. The method may include the following. Feedback information sent by at least two sensors of at least one type is received according a preset period. Monitoring data are grouped according to a monitoring type. One monitoring type corresponds to one data set. Data screening is performed on a data inspecting group updated, and a target sensor is determined.

20 Claims, 7 Drawing Sheets

METHOD FOR TROUBLESHOOTING ABNORMAL SENSOR IN ENERGY-STORAGE APPARATUS, TERMINAL DEVICE, AND STORAGE MEDIUM

CROSS-REFERENCE TO RELATED APPLICATIONS

This application claims priority under 35 U.S.C. § 119(a) to and the benefit of Chinese Patent Application No. 202211375011.9, filed Nov. 4, 2022, the entire disclosure of which is incorporated herein by reference.

TECHNICAL FIELD

This disclosure relates to the field of internet, and in particular to a method for troubleshooting an abnormal sensor in an energy-storage apparatus, a terminal device, and a storage medium.

BACKGROUND

In present society, people are dependent on electrical energy in both daily lives and production activities. Therefore, problems such as production, storage, and transportation of the electrical energy have always been focuses of attention and research for the country and society. Those of ordinary skill in the art need to focus on safety problems during the generation, storage, and transportation of the electrical energy. For example, when an abnormal condition occurs (such as thermal runaway or electrolyte leakage) in a battery, whether a battery is abnormal is often determined according to data collected by a sensor in the related art. However, when the sensor fails, an accuracy of determining whether the battery is abnormal will be greatly affected.

SUMMARY

In a first aspect, a method for troubleshooting an abnormal sensor in an energy-storage apparatus is provided in implementations of the present disclosure. The method may include the following. Feedback information sent by at least two sensors of at least one type is received according to a preset period. The feedback information includes monitoring data and a monitoring type. The monitoring data are grouped according to the monitoring type. One monitoring type corresponds to one data set. For each data set, monitoring data that satisfy a first preset condition is selected as a data inspecting group, according to position information of sensors corresponding to monitoring data in the data set. The first preset condition is that a spatial distance between every two of sensors corresponding to the monitoring data in the data set is less than a first preset value. For each data inspecting group, a distance between a monitored object and a sensor corresponding to each monitoring data in the data inspecting group is determined. A compensation coefficient corresponding to the each monitoring data is determined, according to the distance between the monitored object and the sensor corresponding to the each monitoring data. The compensation coefficient is positively related to the distance between the monitored object and the sensor corresponding to the each monitoring data. The each monitoring data is compensated according to the compensation coefficient corresponding to the each monitoring data, to obtain a data inspecting group updated. Data screening is performed on the data inspecting group updated, and a target sensor is determined. The target sensor is a sensor in a fault state. The data screening is performed on the data inspecting group updated and the target sensor is determined as follows. Whether blank data is included in the data inspecting group updated is determined. When the blank data is included in the data inspecting group updated, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

In a second aspect, a terminal device is provided in implementations of the present disclosure. The terminal device includes a processor, a memory, and a bus. The processor is connected with the memory through the bus. The memory is configured to store a set of program codes. The processor is configured to invoke the program codes stored in the memory to execute the following. Feedback information sent by at least two sensors of at least one type is received according to a preset period. The feedback information includes monitoring data and a monitoring type. The monitoring data are grouped according to the monitoring type. One monitoring type corresponds to one data set. For each data set, monitoring data that satisfy a first preset condition is selected as a data inspecting group, according to position information of sensors corresponding to monitoring data in the data set. The first preset condition is that a spatial distance between every two of sensors corresponding to the monitoring data in the data set is less than a first preset value. For each data inspecting group, a distance between a sensor corresponding to each monitoring data in the data inspecting group and a monitored object is determined. A compensation coefficient corresponding to the each monitoring data is determined, according to the distance between the monitored object and the sensor corresponding to the each monitoring data. The compensation coefficient is positively related to the distance between the monitored object and the sensor corresponding to the monitoring data. The each monitoring data is compensated according to the compensation coefficient corresponding to the each monitoring data, to obtain a data inspecting group updated. Data screening is performed on the data inspecting group updated, and a target sensor is determined. The target sensor is a sensor in a fault state. The data screening is performed on the data inspecting group updated and the target sensor is determined as follows. Whether of blank data is included in the data inspecting group updated is determined. When the blank data is included in the data inspecting group, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

In a third aspect, a storage medium is provided in implementations of the present disclosure, the storage medium stores instructions which, when executed by a computer, implement the following. Feedback information sent by at least two sensors of at least one type is received according a preset period. The feedback information includes monitoring data and a monitoring type. The monitoring data are grouped according to the monitoring type. One monitoring type corresponds to one data set. For each data set, monitoring data that satisfy a first preset condition is selected as a data inspecting group, according to position information of sensors corresponding to monitoring data in the data set. The first preset condition is that a spatial distance between every two of sensors corresponding to the monitoring data in the data set is less than a first preset value. For each data inspecting group, a distance between a monitored object and a sensor corresponding to each monitoring data in the data inspecting group is determined. A compensation coefficient corresponding to the each monitoring data is determined, according to the distance between the monitored object and the sensor corresponding to the each monitoring data. The compensation coefficient is positively related to the distance between the monitored object and the each sensor corresponding to the monitoring data. The each monitoring data is compensated according to the compensation coefficient corresponding to the each monitoring data, to obtain a data inspecting group updated. Data screening is performed on the data inspecting group updated, and a target sensor is determined. The target sensor is a sensor in a fault state. The data screening is performed on the data inspecting group updated and the target sensor is determined as follows. Whether blank data is included in the data inspecting group updated is determined. When the blank data is included in the data inspecting group updated, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

BRIEF DESCRIPTION OF THE DRAWINGS

In order to explain technical solutions in implementations of the present disclosure more clearly, the following will give a brief introduction to accompanying drawings which are needed to be used in description of the implementations. Apparently, the accompanying drawings in the following description are merely some implementations of the present disclosure. For those of ordinary skill in the art, other accompanying drawings can be obtained according to these accompanying drawings without creative efforts.

DETAILED DESCRIPTION

Figure 1:
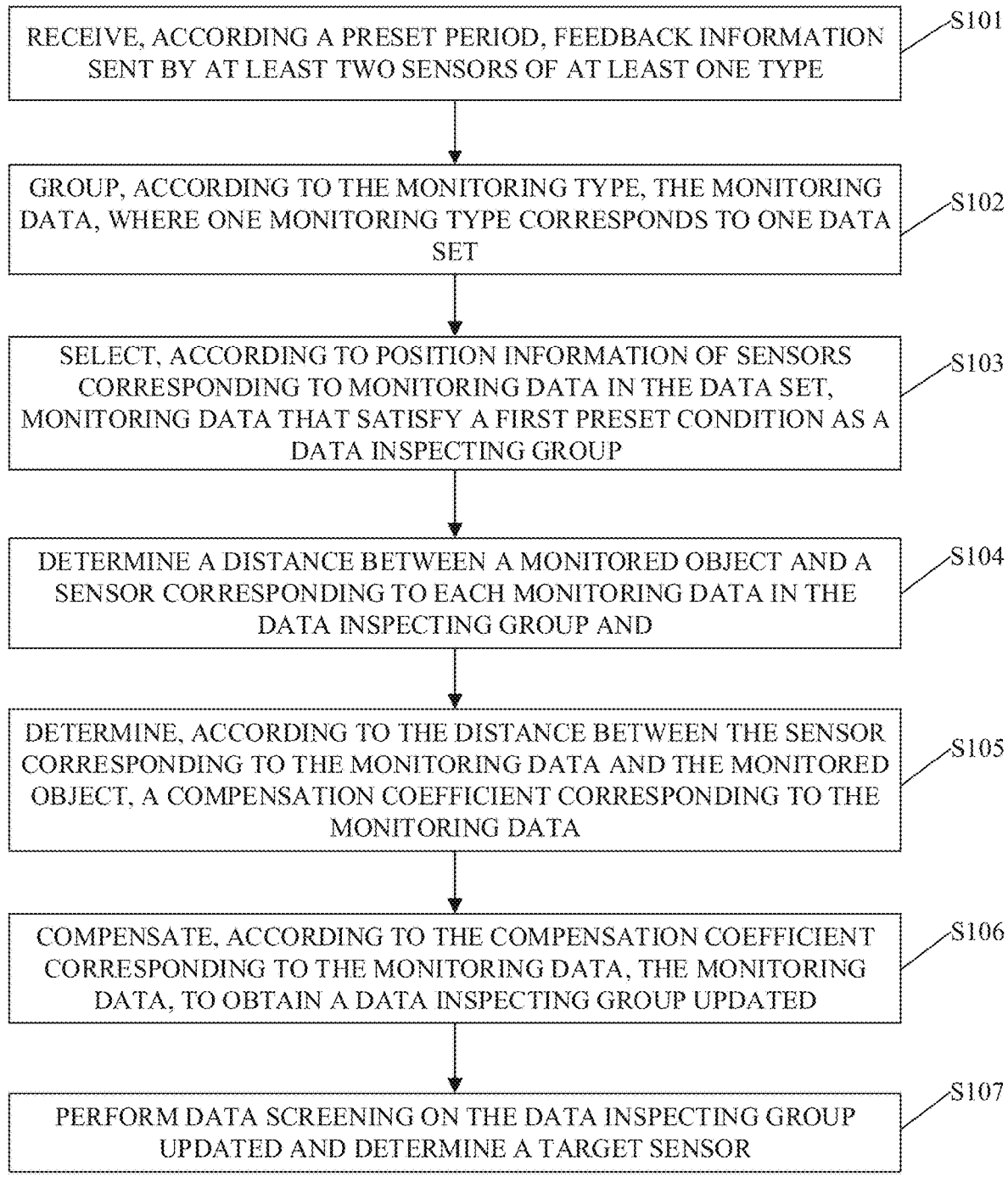
FIG. 1 is a schematic flow diagram illustrating a method for troubleshooting an abnormal sensor in an energy-storage apparatus provided in implementations of the present disclosure.

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

Terms "first", "second", "third", "fourth", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, a method, a system, a product, or a device including a series of operations or units is not limited to the listed operations or units, it can optionally include other operations or units that are not listed; alternatively, other operations or units inherent to the process, the method, the product, or the device can be included either.

A term "implementation" referred to herein means that a particular feature, structure, or characteristic described in conjunction with implementations may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those of ordinary skill in the art that an implementation described herein may be combined with other implementations.

A method for troubleshooting an abnormal sensor in an energy-storage apparatus, a terminal device, and a storage medium are provided in implementations of the present disclosure, such that the abnormal sensor can be efficiently and accurately troubleshooted with aid of intelligent means, which is beneficial to protecting life and property of a user. In addition, in the method in implementations of the present disclosure, a state of a sensor will be comprehensively determined in combination with various factors (e.g., a distance, a monitored object, or a monitored region), such that a possibility of false determination or wrong determination is greatly reduced. Moreover, in the method in implementations of the present disclosure, prompt information will be sent to the user after troubleshooting the abnormal sensor, which is further beneficial to ensuring an accuracy of monitoring data of the sensor, and enabling the user to know an operating situation of an energy supply assembly more accurately and truly.

In a first aspect, a method for troubleshooting an abnormal sensor in an energy-storage apparatus is provided in implementations of the present disclosure. The method may include the following. Feedback information sent by at least two sensors of at least one type is received according a preset period. The feedback information includes monitoring data and a monitoring type. The monitoring data are grouped according to the monitoring type. One monitoring type corresponds to one data set. For each data set, monitoring data that satisfy a first preset condition is selected as a data inspecting group, according to position information of sensors corresponding to monitoring data in the data set. The first preset condition is that a spatial distance between every two of sensors corresponding to the monitoring data in the data set is less than a first preset value. For each data inspecting group, a distance between a monitored object and a sensor corresponding to each monitoring data in the data inspecting group is determined. A compensation coefficient corresponding to the each monitoring data is determined, according to the distance between the monitored object and the sensor corresponding to the monitoring data. The compensation coefficient is positively related to the distance between the monitored object and the sensor corresponding to the each monitoring data. The each monitoring data is compensated according to the compensation coefficient corresponding to the each monitoring data, to obtain a data inspecting group updated. Data screening is performed on the data inspecting group updated, and a target sensor is determined. The target sensor is a sensor in a fault state. The data screening is performed on the data inspecting group updated and the target sensor is determined as follows. Whether blank data is included in the data inspecting group updated is determined. When the blank data is included in the data inspecting group updated, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

It can be seen that in the method in implementations of the present disclosure, an abnormality of the sensor will be troubleshooted in combination with various factors (e.g., a distance, a monitoring type, a monitored region, or a monitored object), to ensure an accuracy of troubleshooting.

In a possible implementation, the method in implementations of the present disclosure can be applied to a scenario where firefighting detection of an energy-storage battery compartment is abnormal. The energy-storage battery compartment includes multiple energy-storage modules and multiple types of sensors. The monitoring type includes at least one of a gas composition, a gas concentration, a temperature, a pressure, a voltage, or a creep distance. The position information of the sensors is spatial positions of the sensors in the energy-storage battery compartment. A monitored region of the sensor is a region where an energy-storage module including the sensor is disposed. The monitored object is the energy-storage module. Accordingly, for the each data set, the method includes the following. The monitoring data that satisfy the first preset condition are selected as the data inspecting group, according to the spatial positions of the sensors corresponding to the monitoring data in the energy-storage battery compartment. The first preset condition is that the spatial distance between said every two of sensors corresponding to the monitoring data is less than the first preset value. Regions where energy-storage modules including sensors are disposed belong to the same monitored region or different monitored regions.

In another possible implementation, the method in implementations of the present disclosure can includes the following. At least one distance attenuation model corresponding to at least one training data type is generated, according to a preset training data set and at least one preset distance algorithm corresponding to at least one training data type in the preset training data set. The at least one training data type is identical to the monitoring type.

In yet another possible implementation, selecting, according to the position information of the sensors corresponding to the monitoring data in the data set, the monitoring data that satisfy the first preset condition as the data inspecting group includes the following. A corresponding target distance attenuation model is selected according to a target monitoring type. A training data type corresponding to the target distance attenuation model is identical to the target monitoring type. The target monitoring data and the target monitoring type are input into the target distance attenuation model to obtain a target critical value corresponding to the target monitoring type. The target critical value is related to a distance between the sensor and the monitored object. The first preset value is determined according to the target critical value.

It can be seen that in the method in implementations of the present disclosure, the distance attenuation model is prepared for each type of monitoring data, such that corresponding first preset values can be generated for different types of monitoring data, which is beneficial to ensuring that data inspecting groups are correctly divided out, and further improving an accuracy of troubleshooting the abnormal sensor in the method in implementations of the present disclosure.

In yet another possible implementation, determining, according to the distance between the monitored object and the sensor corresponding to the each monitoring data, the compensation coefficient corresponding to the each monitoring data includes the following. A compensation function is generated according to historical data and the distance attenuation model. The historical data are a set of all monitoring data received by a terminal device. For each monitoring data, the compensation coefficient corresponding to the monitoring data is generated, according to the distance between the monitored object and the sensor corresponding to the monitoring data, the monitoring type, and the compensation function.

It can be seen that, considering a distance has an influence on various types of monitoring data, in the method in implementations of the present disclosure, compensation calculation is performed on data in each data inspecting group, which is beneficial to reducing inspecting errors in each data inspecting group, and further improving the accuracy of troubleshooting the abnormal sensor in the method in implementations of the present disclosure.

In yet another possible implementation, performing the data screening on the data inspecting group updated and determining the target sensor includes the following. Whether blank data is included in the data inspecting group updated is determined. When the blank data is included in the data inspecting group updated, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

It can be seen that in the method in implementations of the present disclosure, abnormal data can be screened out by performing multi-dimensional processing (deleting the blank data and calculating reference data) on the monitoring data. The method in implementations of the present disclosure is a scientific and rigorous data processing method, and is beneficial to improving an accuracy of data screening.

In yet another possible implementation, after determining whether the blank data is included in the data inspecting group updated, the method further includes the following. When the blank data is not included in the data inspecting group updated, the data inspecting group updated is determined as the first data-inspecting-group, and the first reference data is generated according to the average value of the monitoring data in the first data-inspecting-group. When there is the first monitoring data whose difference with the first reference data is greater than the second preset value, the sensor corresponding to the first monitoring data is marked as the target sensor.

In yet another possible implementation, when there is the first monitoring data whose difference with the first reference data is greater than the second preset value, marking the sensor corresponding to the first monitoring data as the target sensor includes the following. When there is second monitoring data whose difference with the first reference data is greater than a third preset value and less than the second preset value, a sensor corresponding to the second monitoring data is marked as an undermined sensor. Whether the undermined sensor is the target sensor is determined according to feedback information sent by sensors and received in a next period.

It can be seen that in implementations of the present disclosure, a sensor with an abnormal possibility is also marked and carefully observed (troubleshooted), which is beneficial to quickly troubleshooting the abnormal sensor.

In yet another possible implementation, when there is the first monitoring data whose difference with the first reference data is greater than the second preset value, marking the sensor corresponding to the first monitoring data as the target sensor includes the following. When there is the first monitoring data whose difference with the first reference data is greater than the second preset value, the first monitoring data is compared with second reference data in at least one second data-inspecting-group. A spatial distance between an energy-storage module corresponding to the at least one second data-inspecting-group and an energy-storage module corresponding to the first data-inspecting-group is not greater than a fourth preset value. A monitoring type of the at least one second data-inspecting-group is identical to a monitoring type of the first data-inspecting-group. When a difference between the first monitoring data and the second reference data is less than a fifth preset value, a target sensor mark of the sensor corresponding to the first monitoring data is canceled. The fifth preset value is related to the second reference data.

It can be seen that in the method in implementations of the present disclosure, the target sensor may be determined multiple times to avoid false determination or wrong determination, which is beneficial to ensuring the accuracy of troubleshooting the abnormal sensor in the method in implementations of the present disclosure.

In yet another possible implementation, after performing the data screening on the data inspecting group updated and determining the target sensor, the method further includes the following. Prompt information is generated according to the target sensor, and the prompt information is presented on a terminal device. The prompt information is used for prompting a user to replace or maintain the target sensor.

In a second aspect, a terminal device is provided in implementations of the present disclosure. The terminal device includes a processor, a memory, and a bus. The processor is connected with the memory through the bus. The memory is configured to store a set of program codes. The processor is configured to invoke the program codes stored in the memory to execute the following. Feedback information sent by at least two sensors of at least one type is received according a preset period. The feedback information includes monitoring data and a monitoring type. The monitoring data are grouped according to the monitoring type. One monitoring type corresponds to one data set. For each data set, monitoring data that satisfy a first preset condition is selected as a data inspecting group, according to position information of sensors corresponding to monitoring data in the data set. The first preset condition is that a spatial distance between every two of sensors corresponding to the monitoring data in the data set is less than a first preset value. For each data inspecting group, a distance between a monitored object and a sensor corresponding to each monitoring data in the data inspecting group is determined. A compensation coefficient corresponding to the each monitoring data is determined, according to the distance between the monitored object and the sensor corresponding to the each monitoring data. The compensation coefficient is positively related to the distance between the monitored object and the sensor corresponding to the each monitoring data. The each monitoring data is compensated according to the compensation coefficient corresponding to the each monitoring data, to obtain a data inspecting group updated. Data screening is performed on the data inspecting group updated and a target sensor is determined. The target sensor is a sensor in a fault state. The data screening is performed on the data inspecting group updated and the target sensor is determined as follows. Whether blank data is included in the data inspecting group updated is determined. When the blank data is included in the data inspecting group updated, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

In a third aspect, a storage medium is provided in implementations of the present disclosure, the storage medium stores instructions which, when executed by a computer, implement the following. Feedback information sent by at least two sensors of at least one type is received according a preset period. The feedback information includes monitoring data and a monitoring type. The monitoring data are grouped according to the monitoring type. One monitoring type corresponds to one data set. For each data set, monitoring data that satisfy a first preset condition is selected as a data inspecting group, according to position information of sensors corresponding to monitoring data in the data set. The first preset condition is that a spatial distance between every two of sensors corresponding to the monitoring data in the data set is less than a first preset value. For each data inspecting group, a distance between a monitored object and a sensor corresponding to each monitoring data in the data inspecting group is determined. A compensation coefficient corresponding to the each monitoring data is determined, according to the distance between the monitored object and the sensor corresponding to the each monitoring data. The compensation coefficient is positively related to the distance between the monitored object and the sensor corresponding to the each monitoring data. The each monitoring data is compensated according to the compensation coefficient corresponding to the each monitoring data, to obtain a data inspecting group updated. Data screening is performed on the data inspecting group updated, and a target sensor is determined. The target sensor is a sensor in a fault state. The data screening is performed on the data inspecting group updated and the target sensor is determined as follows. Whether blank data is included in the data inspecting group updated is determined. When the blank data is included in the data inspecting group updated, the blank data in the data inspecting group updated is deleted to obtain a first data-inspecting-group, and a sensor corresponding to the blank data is marked as the target sensor. The blank data represents monitoring data that is null. First reference data is generated according to an average value of monitoring data in the first data-inspecting-group. When there is first monitoring data whose difference with the first reference data is greater than a second preset value, a sensor corresponding to the first monitoring data is marked as the target sensor.

In a fourth aspect, a terminal device is further provided in implementations of the present disclosure. The terminal device includes a communication module and a computing module. The communication module is configured to receive feedback information sent by at least two sensors of at least one type according to a preset period. The feedback information includes monitoring data and a monitoring type. The computing module is configured to group the monitoring data according to the monitoring type. One monitoring type corresponds to one data set. The computing module is further configured to select monitoring data that satisfy a first preset condition as a data inspecting group according to position information of sensors corresponding to monitoring data in each data set. The first preset condition is that a spatial distance between every two of sensors corresponding to the monitoring data in the data set is less than a first preset value. The computing module is further configured to determine a distance between a sensor corresponding to each monitoring data in the data inspecting group and a monitored object. The computing module is further configured to determine a compensation coefficient corresponding to the each monitoring data according to the distance between the monitored object and the sensor corresponding to the each monitoring data. The compensation coefficient is positively related to the distance between the monitored object and the sensor corresponding to the each monitoring data. The computing module is further configured to compensate the each monitoring data according to the compensation coefficient corresponding to the each monitoring data, to obtain a data inspecting group updated. The computing module is further configured to perform data screening on the data inspecting group updated and determine a target sensor. The target sensor is a sensor in a fault state.

By implementing the method in implementations of the present disclosure, the monitoring data fed back by sensors can be screened, and then the abnormal sensor can be determined. In the method in implementations of the present disclosure, multi-level and multi-dimensional screening methods are used to minimize a possibility of false determination or wrong determination, and to ensure the accuracy of troubleshooting the abnormal sensor. In the method in implementations of the present disclosure, intelligent processing of data can help improve the efficiency and accuracy of data troubleshooting, and help the user to understand the operating state of the energy supply assembly truly and accurately, which is beneficial to protecting the life and property of the user.

To better understood technical solutions in implementations of the present disclosure, a method for troubleshooting an abnormal sensor in an energy-storage apparatus provided in implementations of the present disclosure is described in detail below with reference to operations in FIG. 1.

Reference is made to FIG. 1, which is a schematic flow diagram illustrating a method for troubleshooting an abnormal sensor in an energy-storage apparatus provided in implementations of the present disclosure. It can be understood that a following method is executed by a terminal device. In addition, the method in implementations of the present disclosure can be applied to a scenario where firefighting detection of an energy-storage battery compartment is abnormal. The energy-storage battery compartment may include multiple energy-storage modules and multiple types of sensors. As illustrated in FIG. 1, the method may include the following.

S101, feedback information sent by at least two sensors of at least one type is received according to a preset period.

It should be noted that the feedback information sent by the sensors may include monitoring data and a monitoring type. In addition, the monitoring type may include at least one of gas composition data, gas concentration data, temperature data, pressure data, voltage data, or a creep distance. Correspondingly, a sensor may be a voltage sensor (which can be used to detect a voltage of a battery cell), a gas sensor (which can be used to detect presence of gaseous substances), a smoke sensor (which can be used to detect a density of particles in smoke), a creep distance sensor (which can be used to detect a surface resistance of the battery cell), a temperature sensor (which can be used to detect a gas temperature), and a pressure sensor (which can be used to detect a gas pressure). Specifically, the gas composition detected by the method in implementations of the present disclosure may include carbon monoxide (CO), propane ($C_3H_8$), and methane ($CH_4$). The creep distance sensor is a printed circuit board (PCB) including two pieces of 100 mm*2 mm sheet, and the two pieces of sheet are spaced apart from each other by 1 mm. On a clean surface, there is a large internal resistance between the two pieces of sheet of the creep distance sensor. However, when the surface is contaminated, the internal resistance drops rapidly, and a signal can be generated through a voltage divider. It should be noted that there may also be a composite sensor having at least two functions of the above sensor type.

In a possible implementation, the preset period in which the terminal device receives the feedback information from the sensor is set by a technician, and can also be adjusted by the user according to an actual situation. For the terminal device, the preset period can be set by the user. The preset period needs to be set in consideration of data-transmission costs and corresponding change rules of monitoring data, which is not limited herein.

It should be noted that the feedback information sent by the same sensor may include different types of monitoring data. Exemplarily, the gas sensor is able to detect a gas composition, and the composite sensor with a gas detection function is also able to detect the gas component.

Furthermore, the terminal device involved in the method in implementations of the present disclosure may also be referred to as a user terminal or a client terminal, and the terminal device may be fixed or mobile. Specifically, the terminal device may be a mobile phone, a tablet computer (e.g., Pad), a computer with a wireless transceiver function, a wearable terminal device, etc. An operating system of a terminal device at PC end, such as an all-in-one computer, may include but not limited to a Linux system, Unix system, Windows series system (such as Windows xp, Windows 7, etc.), Mac OS X (operating system of Apple computer), and other operating systems. An operating system of a terminal device at mobile end, such as a smart phone, may include but not limited to an Android system, IOS (operating system of Apple phone), Window system, and other operating systems.

It can be seen that in the method in implementations of the present disclosure, various monitoring data fed back by various sensors can be periodically received, which is beneficial to ensuring an accuracy of troubleshooting abnormal data in the method in implementations of the present disclosure.

S102, the monitoring data are grouped according to the monitoring type, and one monitoring type corresponds to one data set.

Exemplarily, if the monitoring type in the feedback information received by the terminal device is type 1, type 2, and type 3, the terminal device will store monitoring data belonging to type 1 to data set 1, store monitoring data belonging to type 2 to data set 2, and store monitoring data belonging to type 3 to data set 3. By classifying the monitoring data, the terminal device is facilitated to subsequently troubleshoot the abnormal data, and then determine the abnormal sensor.

It can be seen that in the method in implementations of the present disclosure, the monitoring data can be classified based on the monitoring type, which can improve an efficiency of screening out the abnormal data in the method in implementations of the present disclosure, and also is beneficial to screening out the abnormal data according to different data evaluation criteria, thereby troubleshooting the abnormal sensor.

Furthermore, for each data set, the method includes the following.

S103, monitoring data that satisfy a first preset condition are selected as a data inspecting group, according to position information of sensors corresponding to monitoring data in the data set.

It should be noted that the first preset condition is that a spatial distance between every two of sensors corresponding to the monitoring data in the data set is less than a first preset value. The sensors corresponding to the monitoring data belong to the same monitored region or different monitored regions. Furthermore, the position information of the sensors are spatial positions of the sensors in the energy-storage battery compartment.

Figure 2:
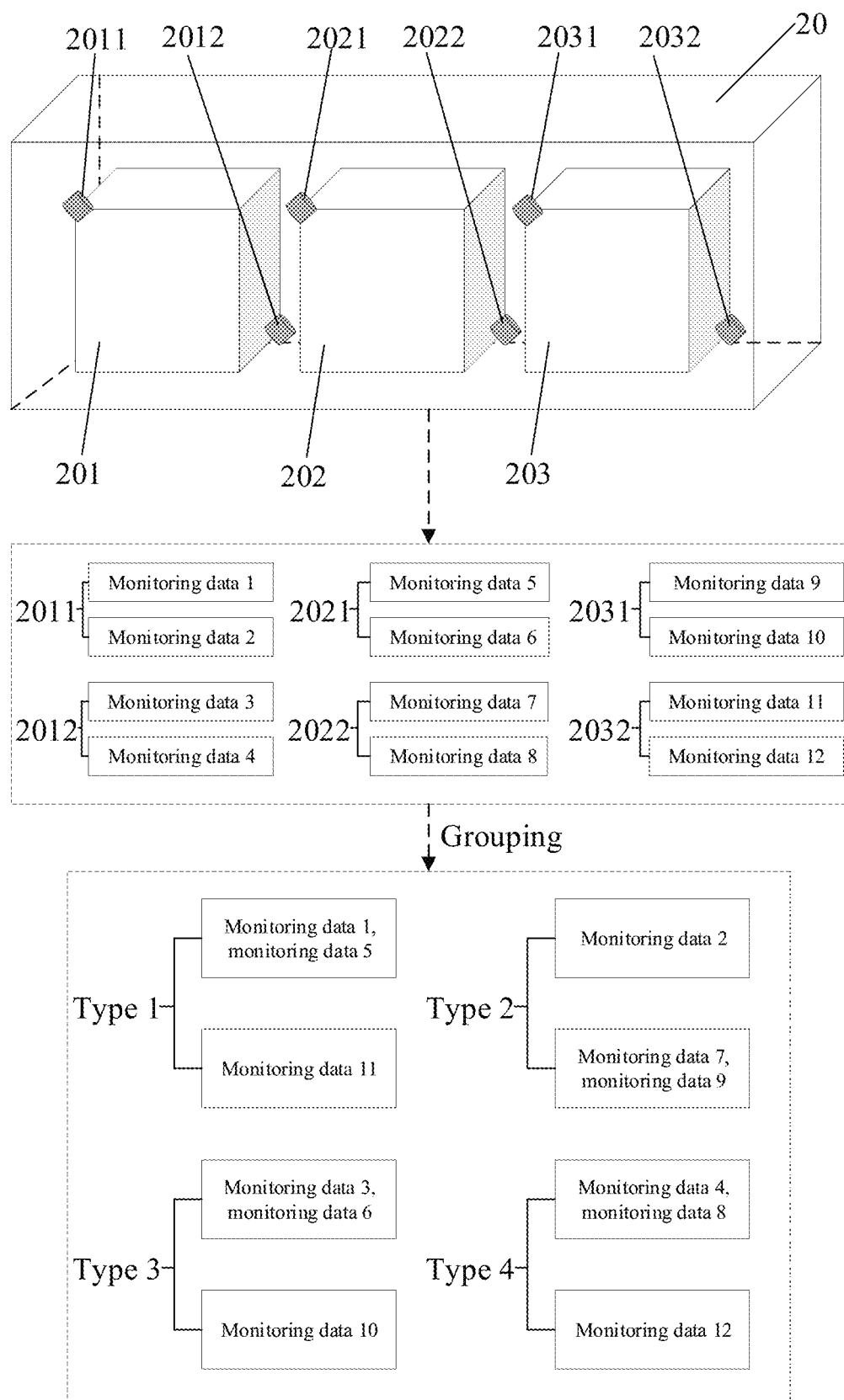
FIG. 2 is a schematic diagram illustrating a scenario for dividing out data inspecting groups provided in implementations of the present disclosure.

Exemplarily, reference is made to FIG. 2, which is a schematic diagram illustrating a scenario for dividing out data inspecting groups provided in implementations of the present disclosure. As illustrated in FIG. 2, the energy-storage battery compartment 20 is provided with an energy-storage module 201, an energy-storage module 202, and an energy-storage module 203. Each of three energy-storage modules is a cube with an edge length of 80 cm, and a distance between two adjacent energy-storage modules is 40 cm (i.e., a distance between the energy-storage module 201 and the energy-storage module 202 is 40 cm, and a distance between the energy-storage module 202 and the energy-storage module 203 is 40 cm). Furthermore, the energy-storage module 201 is provided with a composite sensor 2011 (which collects monitoring data 1 and monitoring data 2, corresponding to type 1 and type 2, respectively) and a composite sensor 2012 (which collects monitoring data 3 and monitoring data 4, corresponding to type 3 and type 4, respectively). The energy-storage module 202 is provided with a sensor 2021 (which collects monitoring data 5 and monitoring data 6, corresponding to type 1 and type 3, respectively) and a sensor 2022 (which collects monitoring data 7 and monitoring data 8, corresponding to type 2 and type 4, respectively). The energy-storage module 203 is provided with a sensor 2031 (which collects monitoring data 9 and monitoring data 10, corresponding to type 2 and type 3, respectively) and a sensor 2032 (which collects monitoring data 11 and monitoring data 12, corresponding to type 1 and type 4, respectively).

Here, if the first preset value is 120 cm, there may be following grouping cases for type 1: monitoring data 1 collected by the sensor 2011 and the monitoring data 5 collected by the sensor 2021 are treated as one group, and the monitoring data 11 collected by the sensor 2032 is treated as one group; there may be following grouping cases for type 2: monitoring data 2 collected by the sensor 2011 is treated as one group, monitoring data 7 collected by the sensor 2022 and monitoring data 9 collected by the sensor 2031 are treated as one group; there may be following grouping cases for type 3: monitoring data 3 collected by the sensor 2012 and monitoring data 6 collected by sensor 2021 are treated as one group, and monitoring data 10 collected by the sensor 2031 is treated as one group; and there may be following grouping cases for type 4: monitoring data 4 collected by the sensor 2012 and monitoring data 8 collected by the sensor 2022 are treated as one group, and monitoring data 12 collected by the sensor 2032 is treated as one group.

It should be noted that the above example illustrates a situation where single monitoring data is a group, which is only for a simple example of a method for dividing out the data inspecting group according to a distance mentioned in implementations of the present disclosure. In actual determination situation, a technician will reasonably set positions and types of sensors to avoid the situation where the single monitoring data is one group. In addition, for the situation where the single monitoring data is one group, an operator can combine other data inspecting groups to determine whether the single monitoring data is abnormal.

In a possible implementation, the method in implementations of the present disclosure may include the following. At least one distance attenuation model corresponding to at least one training data type is generated, according to a preset training data set and a preset distance algorithm corresponding to a training data type in the preset training data set. The training data type is identical to the above monitoring type.

Figure 3:
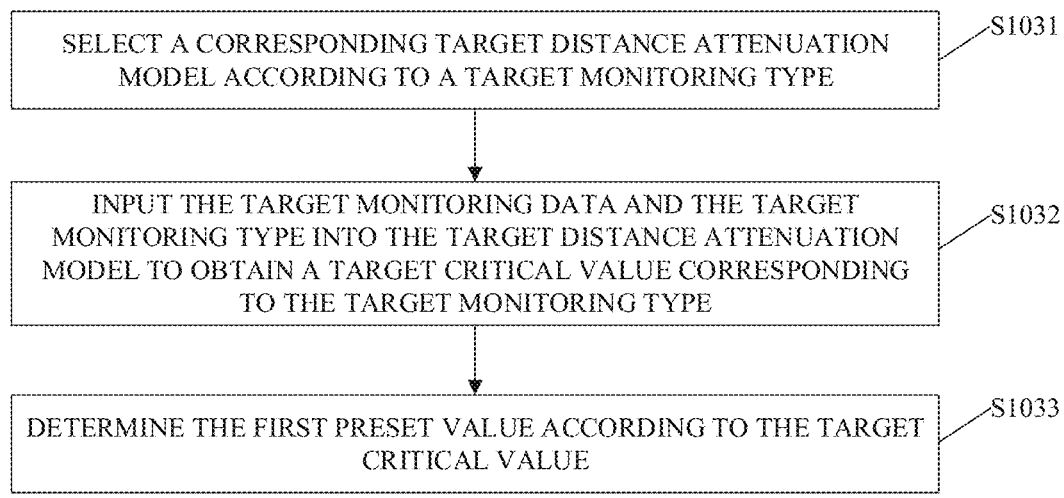
FIG. 3 is a schematic flow diagram illustrating a method for determining a first preset value provided in implementations of the present disclosure.

Furthermore, reference is made to FIG. 3, which is a schematic flow diagram illustrating a method for determining a first preset value provided in implementations of the present disclosure. As illustrated in FIG. 3, at S103, selecting the monitoring data that satisfy the first preset condition as the data inspecting group according to the position information of the sensors corresponding to the monitoring data in the data set may include the following.

S1031, a corresponding target distance attenuation model is selected according to a target monitoring type.

S1032, target monitoring data and the target monitoring type are input into the target distance attenuation model to obtain a target critical value corresponding to the target monitoring type.

S1033, the first preset value is determined according to the target critical value.

A training data type corresponding to the target distance attenuation model is identical to the target monitoring type. The target critical value is related to a distance between the sensor and the monitored object.

Specifically, the distance attenuation model is obtained by training an attenuation function of monitoring data of a certain type with respect to distance. Exemplarily, for temperature monitoring data, when thermal runaway occurs in an energy-storage module, temperature data monitored by a temperature sensor closer to a faulty energy-storage module will be higher, and conversely, temperature data monitored by a temperature sensor farther away from the faulty energy-storage module will be lower. Therefore, the abnormal data can be screened out by using "a distance between a sensor and a monitored object". A data in the same data inspecting group that does not satisfy the corresponding distance attenuation model is determined as the abnormal data, and a sensor corresponding to the abnormal data is determined as the target sensor. The target sensor represents a sensor in a fault state, and the fault state may indicate that the monitoring data corresponding to the sensor does not satisfy a preset condition (e.g., "does not satisfy the distance attenuation model" as mentioned above).

Specifically, a monitoring type of data inspecting group can be input into a distance attenuation model corresponding to the monitoring type to obtain a corresponding critical value, and the first preset value is determined according to the critical value. For each of various types of monitoring data, an attenuation relationship (i.e., a functional relationship) between monitoring data and a distance is not linear, a value of monitoring data generally changes greatly in a specific range (which is set as a first range) due to differences in distance, and in other ranges (which are set as a second range), an influence of the distance on the value of the monitoring data is not obvious, so the above critical value can be determined according to the first range and the second range, which ensures scientific division of data inspecting groups and is also beneficial to ensuring the accuracy of troubleshooting the abnormal data in method in implementations of the present disclosure. Furthermore, different monitoring types correspond to different first preset values.

It can be seen that in implementations of the present disclosure, the monitoring data in the same data set are reasonably grouped, which is beneficial to obtaining a more accurate screening result of the abnormal data. In addition, in the method in implementations of the present disclosure, a relevant preset value is calculated through the distance attenuation model (e.g., the first preset value is determined according to the critical value above), which is beneficial to ensuring the scientific grouping in the method in implementations of the present disclosure. Furthermore, in the method in implementations of the present disclosure, the abnormal data can also be directly screened out through the distance attenuation model, and the distance attenuation model obtained from multiple training data can further ensure the accuracy of screening out the abnormal data.

Possibly, the method in implementations of the present disclosure may further include the following. Monitoring data that satisfy a second preset condition are selected as a data inspecting group, according to monitored regions to which sensors corresponding to the monitoring data belong.

It should be noted that the second preset condition is that the sensors corresponding to the monitoring data belong to the same monitored region. Furthermore, a monitored region of a sensor is a region where an energy-storage module including the sensor is disposed.

Figure 4:
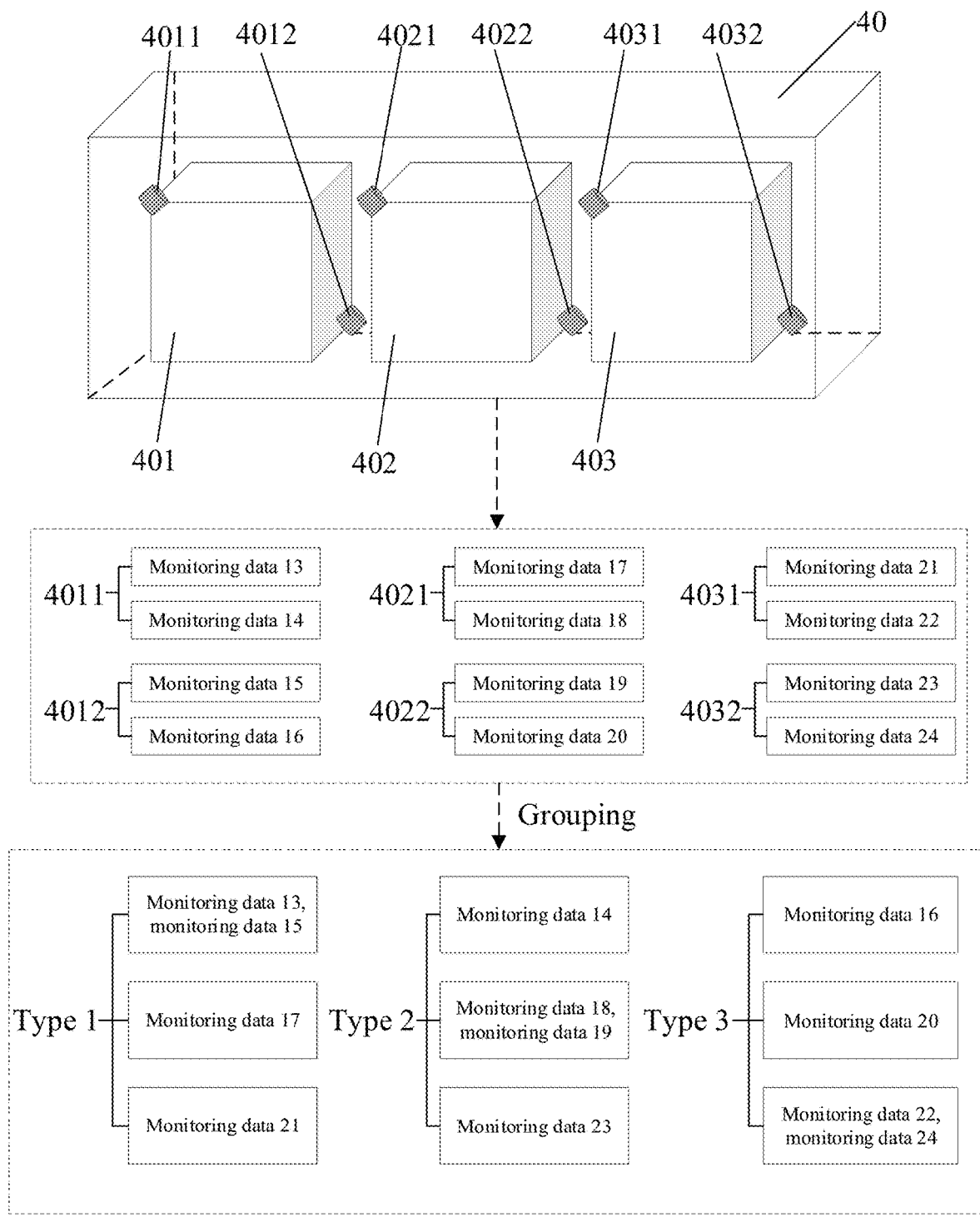
FIG. 4 is a schematic diagram illustrating a scenario for dividing out data inspecting groups provided in other implementations of the present disclosure.

Exemplarily, reference is made to FIG. 4, which is a schematic diagram illustrating a scenario for dividing out data inspecting groups provided in other implementations of the present disclosure. As illustrated in FIG. 4, the energy-storage battery compartment 40 is provided with an energy-storage module 401, an energy-storage module 402, and an energy-storage module 403. The energy-storage module 401 is provided with a sensor 4011 (which collects monitoring data 13 and monitoring data 14, corresponding to type 1 and type 2, respectively) and a sensor 4012 (which collects monitoring data 15 and monitoring data 16, corresponding to type 1 and type 3, respectively). The energy-storage module 402 is provided with a sensor 4021 (which collects monitoring data 17 and monitoring data 18, corresponding to type 1 and type 2, respectively) and a sensor 4022 (which collects monitoring data 19 and monitoring data 20, corresponding to type 2 and type 3, respectively). The energy-storage module 403 is provided with a sensor 4031 (which collects monitoring data 21 and monitoring data 22, corresponding to type 1 and type 3, respectively) and a sensor 4032 (which collects monitoring data 23 and monitoring data 24, corresponding to type 2 and type 3, respectively).

There may be following grouping cases for type 1: monitoring data 13 collected by the sensor 4011 and monitoring data 15 collected by the sensor 4012 are treated as one group, monitoring data 17 collected by the sensor 4021 is treated as one group, and monitoring data 21 collected by the sensor 4031 is treated as one group; there may be following grouping cases for type 2: monitoring data 14 collected by the sensor 4011 is treated as one group, monitoring data 18 collected by the sensor 4021 and monitoring data 19 collected by the sensor 4022 are treated as one group, and monitoring data 23 collected by the sensor 4032 is treated as one group; and there may be following grouping cases for type 3: monitoring data 16 collected by the sensor 4012 is treated as one group, monitoring data 20 collected by the sensor 4022 is treated as one group, and monitoring data 22 collected by the sensor 4031 and monitoring data 24 collected by the sensor 4032 are treated as one group.

It should be noted that the above example illustrates a situation where single monitoring data is a group, which is only for a simple example of a method for dividing out the data inspecting group according to a distance mentioned in implementations of the present disclosure. In actual determination situation, a technician will reasonably set positions and types of sensors to avoid the situation where the single monitoring data is one group. In addition, for the situation where the single monitoring data is one group, an operator can combine other data inspecting groups to determine whether the single monitoring data is abnormal.

Furthermore, for the same data inspecting group in a single data set, the method includes the following.

S104, a distance between a monitored object and a sensor corresponding to each monitoring data in the data inspecting group is determined.

Exemplarily, sensors corresponding to monitored object 1 include sensor 1 (including monitoring data 25 and monitoring data 26, where a monitoring type of monitoring data 25 is type 1 and a monitoring type of monitoring data 26 is type 2), sensor 2 (including monitoring data 27, where a monitoring type of monitoring data 27 is type 1) and sensor 3 (including monitoring data 28, where a monitoring type of monitoring data 28 is type 2).

Here, the monitoring data 25 and the monitoring data 27 belong to the same data inspecting group (e.g., data inspecting group 1), and the monitoring data 26 and the monitoring data 28 belong to the same data inspecting group (e.g., data inspecting group 2). Therefore, for data inspecting group 1, distance 1 between sensor 1 and monitored object 1 and distance 2 between sensor 2 and monitored object 1 are distances to be determined at S104. For data inspecting group 2, distance 1 between sensor 1 and monitored object 1 and distance 3 between sensor 3 and monitored object 1 are distances to be determined at S104.

S105, a compensation coefficient corresponding to the monitoring data is determined, according to the distance between the monitored object and the sensor corresponding to the each monitoring data.

It should be noted that the compensation coefficient is positively related to the distance between the monitored object and the sensor corresponding to the monitoring data. In other words, when the sensor corresponding to the monitoring data is farther away from the monitored object (referring to a monitored object corresponding to the sensor), the compensation coefficient of the monitoring data is greater.

Figure 5:
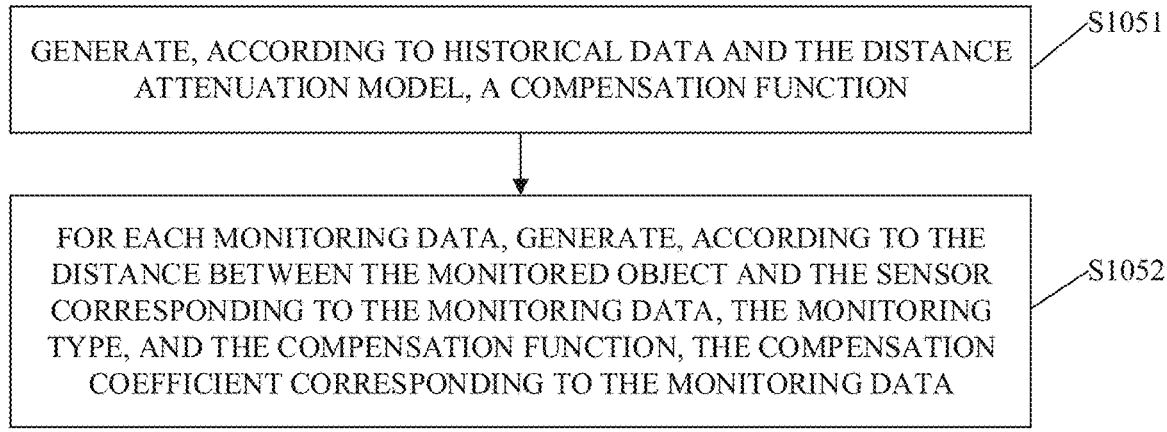
FIG. 5 is a schematic flow diagram illustrating a method for generating a compensation coefficient provided in implementations of the present disclosure.

In a possible implementation, reference is made to FIG. 5, which is a schematic flow diagram illustrating a method for generating a compensation coefficient provided in implementations of the present disclosure. As illustrated in FIG. 5, at S105, determining, according to the distance between the monitored object and the sensor corresponding to the each monitoring data, the compensation coefficient corresponding to the each monitoring data may include the following.

S1051, a compensation function is generated according to historical data and the at least one distance attenuation model.

S1052, for single monitoring data, the compensation coefficient corresponding to the monitoring data is generated, according to the distance between the monitored object and the sensor corresponding to the each monitoring data, the monitoring type, and the compensation function.

The historical data are a set of all monitoring data received by the terminal device.

Specifically, in implementations of the present disclosure, compensation functions can be generated according to attenuation functions corresponding to distance attenuation models of different monitoring types (i.e., a function corresponding to "monitoring data-distance", where "distance" is a distance between the monitored object and the sensor corresponding to the monitoring data) and critical values in the distance attenuation models of the different monitoring types. A method for generating the compensation function can refer to a partial least square method or an interpolation method, etc., which is not limited in the present disclosure. It should be noted that different monitoring types may correspond to different compensation functions, and then there are different compensation methods for monitoring data.

Exemplary, in the method in implementations of the present disclosure, a compensation function for each monitoring data is obtained, according to a change of monitoring data in each data inspecting group in the historical data and a distance attenuation model corresponding to each monitoring data type, which is beneficial to adjusting values of monitoring data in the same data inspecting group to a reasonable range, and is beneficial to distinguishing the abnormal data more accurately in the method in implementations of the present disclosure.

S106, the monitoring data is compensated according to the compensation coefficient corresponding to the monitoring data, to obtain a data inspecting group updated.

S107, data screening is performed on the data inspecting group updated, and a target sensor is determined.

It should be noted that the target sensor is in a fault state, and the fault state can indicate that the monitoring data corresponding to the sensor does not satisfy the preset condition.

Figure 6:
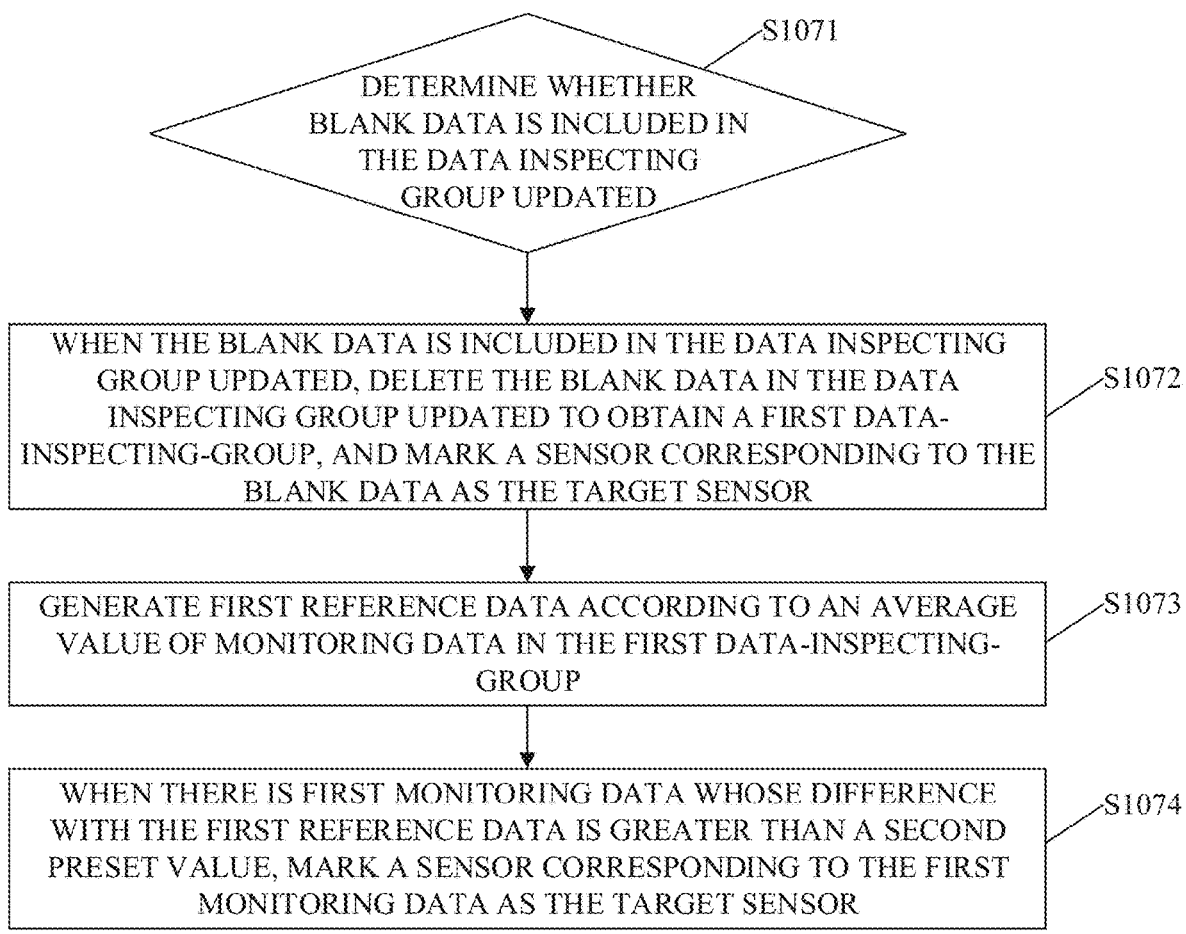
FIG. 6 is a schematic flow diagram illustrating a method for determining a target sensor provided in implementations of the present disclosure.

In a possible implementation, reference is made to FIG. 6, which is a schematic flow diagram illustrating a method for determining a target sensor provided in implementations of the present disclosure. As illustrated in FIG. 6, at S107, performing the data screening on the data inspecting group updated and determining the target sensor may include the following.

S1071, whether blank data is included in the data inspecting group updated is determined.

S1072, when the blank data is included in the data inspecting group updated, the blank data in the data inspecting group updated is deleted to obtain a first data-inspecting-group, and a sensor corresponding to the blank data is marked as the target sensor.

S1073, first reference data is generated according to an average value of monitoring data in the first data-inspecting-group.

S1074, when there is first monitoring data whose difference with the first reference data is greater than a second preset value, a sensor corresponding to the first monitoring data is marked as the target sensor.

The blank data represents monitoring data that is null.

Possibly, in the method in implementations of the present disclosure, the first reference data can also be determined by using methods such as normal distribution, median absolute deviation, inter-quartile range (IQR), or etc.

Exemplary, data in the data inspecting group updated are now set as: null, 10, 13, 16, 5, and 3, corresponding to sensor 4, sensor 5, sensor 6, sensor 7, sensor 8, and sensor 9, respectively. Firstly, data "null" is removed, sensor 4 corresponding to data "null" is marked as the target sensor, and then the first data-inspecting-group is obtained as: 10, 13, 16, 5, and 3. For the first data-inspecting-group, the first reference data is calculated to be 9.4 by using an average method. If the second preset value is 6.5, data "16" can be determined as abnormal data, and sensor 7 corresponding to data "16" is marked as the target sensor.

Exemplary, data in a data inspecting group are now set as: 150, 30, 63, 70, and 100, corresponding to sensor 10 (where a distance between sensor 10 and a corresponding monitored object is 20 cm), sensor 11 (where a distance between sensor 11 and a corresponding monitored object is 60 cm), sensor 12 (where a distance between sensor 12 and a corresponding monitored object is 50 cm), sensor 13 (where a distance between sensor 13 and a corresponding monitored object is 30 cm), and sensor 14 (where a distance between sensor 14 and a corresponding monitored object is 20 cm), respectively. After compensation calculation (e.g., a compensation formula is set as $y=[(x-20)/10]^2*1.2$, where y is the compensation coefficient, x is the distance between the sensor and the monitored object; and a compensating method for data in the data inspecting group is: N+y, where N is data in an original data inspecting group, and y is the compensation coefficient, that is, the data in the original data inspecting group each are added to a corresponding compensation coefficient) is performed on this data inspecting group, the data inspecting group updated can be obtained as 150, 49.2, 73.8, 71.2, and 100. If the second preset value is set as 40 and no compensation (or compensation calculation) is performed on the data in the original data inspecting group, the first reference data corresponding to the original data inspecting group is obtained as 82.6, and then sensor 10 corresponding to data 150 and sensor 11 corresponding to data 30 can be determined as the target sensors. If the second preset value is set as 40 and the compensation (or the compensation calculation) is performed on the data in the original data inspecting group, the first reference data corresponding to the original data inspecting group is obtained as 88.84, and then sensor 10 corresponding to data 150 can be determined as the target sensor. It can be seen from the above examples that after the compensation (or the compensation calculation) is performed on the data in the original data inspecting group, a determination accuracy of the target sensor can be improved and a possibility of false determination can be reduced.

It can be seen that in the method in implementations of the present, the first reference data may be determined according to various ways to ensure the accuracy of screening out the abnormal data in the method in implementations of the present disclosure.

In another possible implementation, when there is the first monitoring data whose difference with the first reference data is greater than the second preset value, marking the sensor corresponding to the first monitoring data as the target sensor may include the following. When the blank data is not included in the data inspecting group updated, the data inspecting group updated is determined as the first data-inspecting-group, and the first reference data is generated according to the average value of the monitoring data in the first data-inspecting-group. When there is the first monitoring data whose difference with the first reference data is greater than the second preset value, the sensor corresponding to the first monitoring data is marked as the target sensor.

Figure 7:
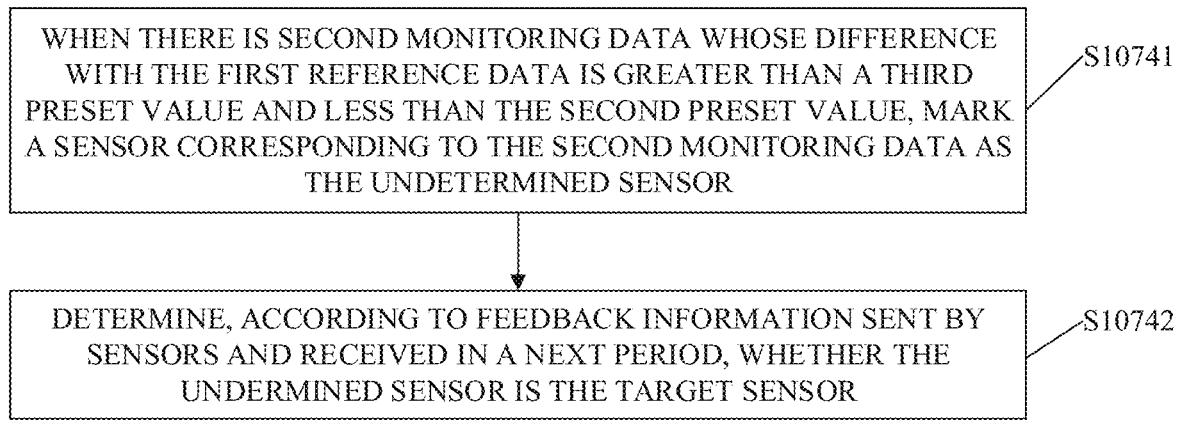
FIG. 7 is a schematic flow diagram illustrating a method for determining a target sensor provided in other implementations of the present disclosure.

In another possible implementation, reference is made to FIG. 7, which is a schematic flow diagram illustrating a method for determining a target sensor provided in other implementations of the present disclosure. As illustrated in FIG. 7, at S1074, when there is the first monitoring data whose difference with the first reference data is greater than the second preset value, marking the sensor corresponding to the first monitoring data as the target sensor may include the following.

S10741, when there is second monitoring data whose difference with the first reference data is greater than a third preset value and less than the second preset value, a sensor corresponding to the second monitoring data is marked as the undetermined sensor.

S10742, whether the undetermined sensor is the target sensor is determined according to the feedback information sent by sensors and received in a next preset period.

Exemplarily, for the above examples, the data inspecting group updated: null, 10, 13, 16, 5, and 3, correspond to sensor 4, sensor 5, sensor 6, sensor 7, sensor 8, and sensor 9, respectively. For the first data-inspecting-group: 10, 13, 16, 5, and 3, the third preset value is set as 6, so there is data "3" that satisfies a condition of "greater than third preset value (6) and less than second preset value (6.5)", and sensor 9 corresponding to data "3" is marked as the undetermined sensor. Furthermore, after the terminal device in implementations of the present disclosure receives a new batch of feedback information (e.g., feedback information received in the next preset period), the terminal device determines whether sensor 9 is the target sensor according to new monitoring data.

Possibly, if the undetermined sensor is not determined as the target sensor after preset times of determinations, the "undetermined sensor" mark of the sensor can be canceled. Alternatively, a sensor that is marked as the undetermined sensor multiple times can be determined as the target sensor. Exemplarily, if sensor 15 (which is marked as the "undetermined sensor") is not determined as the target sensor after five times of determinations, the "undetermined sensor" mark of sensor 15 is canceled. Alternatively, if sensor 16 is determined as the "undetermined sensor" five times in succession, sensor 16 is determined as the "target sensor". Specifically, a determination method of "undetermined sensor-normal sensor-target sensor" is set by a technician according to an actual situation.

Furthermore, in the method in implementations of the present disclosure, a data inspecting group having monitoring data fed back by the undermined sensor can be preferentially processed, that is, when a data inspecting group includes monitoring data where a corresponding sensor is the undetermined sensor, a processing priority of the data inspecting group is increased. When there are more monitoring data corresponding to undetermined sensors in a data inspecting group, the data inspecting group has a higher priority. Exemplarily, if one sensor corresponding to monitoring data in data inspecting group 3 is the "undetermined sensor", none of sensors corresponding to monitoring data in data inspecting group 4 is marked as the "undetermined sensor", and three sensors corresponding to monitoring data in data inspecting group 5 are marked as the "undetermined sensors", the terminal device in the method in implementations of the present disclosure processes the three data inspecting groups in following order: data inspecting group 5, data inspecting group 3, data inspecting group 4. It should be noted that for a data inspecting group (such as data inspecting group 4) that does not include the monitoring data fed back by the undetermined sensor, the processing order or priority of the data inspecting group can be determined according to the amount of monitoring data in the data inspecting group, feedback time of the monitoring data in the data inspecting group, or a monitoring type in the data inspecting group, etc. Specifically, a processing order or priority of the data inspecting group is set by the technician according to the actual situation, which is not limited herein.

It can be seen that in the method in implementations of the present disclosure, the undetermined sensor can also be marked, and an operating state of the undetermined sensor can be emphatically observed or determined, which is beneficial to improving a speed and an accuracy of screening out the abnormal data.

In another possible implementation, when there is the first monitoring data whose difference with the first reference data is greater than the second preset value, marking the sensor corresponding to the first monitoring data as the target sensor may include the following. When there is the first monitoring data whose difference with the first reference data is greater than the second preset value, the first monitoring data is compared with second reference data in at least one second data-inspecting-group. A spatial distance between an energy-storage module corresponding to the at least one second data-inspecting-group and an energy-storage module corresponding to the first data-inspecting-group is not greater than a fourth preset value. When a difference between the first monitoring data and the second reference data is less than a fifth preset value, a target sensor mark of the sensor corresponding to the first monitoring data is canceled.

It should be noted that a monitoring type of the at least one second data-inspecting-group is identical to a monitoring type of the first data-inspecting-group. Furthermore, the fifth preset value is related to the second reference data.

Specifically, when the target sensor marked is relatively close to an abnormal energy-storage module (such as an energy-storage module in which thermal runaway occurs), the target sensor will be affected by the abnormal energy-storage module, and sensors corresponding to other monitoring data in the same data inspecting group are relatively away from the abnormal energy-storage module, so there will be a relatively large error between each of monitoring data collected by these sensors and the monitoring data collected by the target sensor. In order to eliminate this error or prevent this false determination, in the method in implementations of the present disclosure, the monitoring data collected by the target sensor will be compared with each of reference data of other data inspecting groups to ensure the accuracy of screening out the abnormal data.

Exemplary, monitoring data collected by sensor 17 (which monitors energy-storage module 1, where a distance between energy-storage module 1 and energy-storage module 2 is in a preset range, and energy-storage module 2 is an abnormal energy-storage module) belongs to data inspecting group 5 (except for the monitoring data collected by the sensor 17, a distance between each of the sensors corresponding to other monitoring data and energy-storage module 2 is not in the preset range), and some or all of monitoring data collected by sensors corresponding to energy-storage module 2 belong to data inspecting group 6. When monitoring data type of data inspecting group 5 and monitoring data type of data inspecting group 6 each are a temperature, the monitoring data corresponding to sensor 17 will have a relatively large deviation from each of other monitoring data in data inspecting group 5, and sensor 17 may be determined as the target sensor. Here, the monitoring data collected by sensor 17 need to be compared with reference data in data inspecting group 6, and it will be found that there is a relatively small deviation between the monitoring data collected by sensor 17 and each of the monitoring data in data inspecting group 6, and a "target sensor" mark of sensor 17 needs to be canceled.

Exemplarily, for the above examples, the first data-inspecting-group: 10, 13, 16, 5, and 3 correspond to sensor 5, sensor 6, sensor 7, sensor 8, and sensor 9, respectively. When the second preset value is 6.5, sensor 7 corresponding to data "16" is marked as a target sensor. Here, if second reference data in the second data-inspecting-group is 12 and the fifth preset value is 5, data "16" satisfies a condition that "a difference between data (16) and second reference data (12) is less than fifth preset value (5)", and the "target sensor" mask of sensor 7 can be canceled.

It can be seen that in the method in implementations of the present disclosure, the sensor marked as the "target sensor" will be rechecked, and whether the sensor is a true "target sensor" is determined by comparing the monitoring data collected by the "target sensor" with each of monitoring data in other adjacent data inspecting groups, which is beneficial to ensuring the accuracy of screening out the abnormal sensor (data) and avoiding waste of resources.

In another possible implementation, after performing the data screening on the data inspecting group updated, and determining the target sensor, the method further includes the following. Prompt information is generated according to the target sensor, and the prompt information is presented on a terminal device.

It should be noted that the prompt information is used for prompting a user to replace or maintain the target sensor.

Exemplarily, if there is sensor 18 as the target sensor, prompt information like "sensor 18 is the target sensor, sensor 18 is a temperature sensor disposed at the lower left of energy-storage module 1, and please replace energy-storage module 1 in time!" can be generated. The prompt information may be presented on the terminal device, or presented through voice broadcast.

By implementing the method in implementations of the present disclosure, the abnormal data can be screened out, and then the abnormal sensor (i.e., the target sensor mentioned above) can be determined. In the method in implementations of the present disclosure, the accuracy of screening out the abnormal data is effectively ensured through a manner of multi-dimensional and flexible data grouping. In addition, in the method in implementations of the present disclosure, the abnormal data will also be rechecked, such that a possibility of false determination of the abnormal data is further reduced.

An apparatus related to implementations of the present disclosure is described below with reference to the accompanying drawings.

Figure 8:
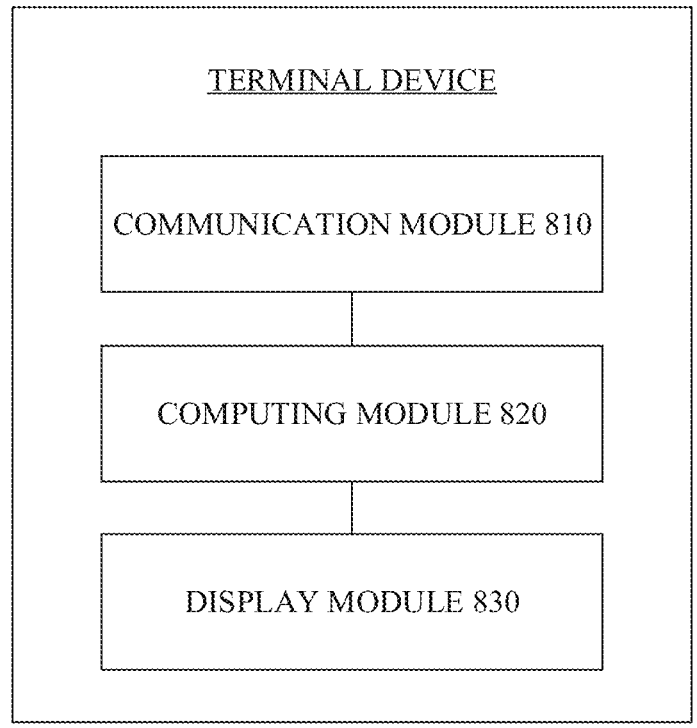
FIG. 8 is a schematic diagram illustrating a composition of a terminal device provided in implementations of the present disclosure.

Reference is made to FIG. 8, which is a schematic diagram illustrating a composition of a terminal device provided in implementations of the present disclosure. The terminal device may include a communication module 810, a computing module 820, and a display module 830. The communication module 810 can be configured to receive feedback information sent by at least two sensors of at least one type according to a preset period. The feedback information may include monitoring data and a monitoring type. The computing module 820 can be configured to group the monitoring data according to the monitoring type. One monitoring type corresponds to one data set. The computing module 820 can be further configured to select monitoring data that satisfy a first preset condition as a data inspecting group according to position information of sensors corresponding to monitoring data in each data set. The first preset condition is that a spatial distance between every two of sensors corresponding to the monitoring data is less than a first preset value. The computing module 820 can further be configured to determine a distance between a monitored object and a sensor corresponding to each monitoring data in the data inspecting group. The computing module 820 can further be configured to determine a compensation coefficient corresponding to the each monitoring data according to the distance between the monitored object and the sensor corresponding to the each monitoring data. The compensation coefficient is positively related to the distance between the monitored object and the sensor corresponding to the each monitoring data. The computing module 820 can further be configured to compensate the each monitoring data according to the compensation coefficient corresponding to the each monitoring data, to obtain a data inspecting group updated. The computing module 820 can be further configured to perform data screening on the data inspecting group updated, and determine a target sensor. The target sensor is a sensor in a fault state.

In a possible implementation, the monitoring type includes at least one of gas composition data, gas concentration data, temperature data, pressure data, voltage data, or a creep distance. The position information of the sensors is spatial positions of the sensors in an energy-storage battery compartment. A monitored region of the sensor is a region where an energy-storage module including the sensor is disposed. The monitored object is the energy-storage module. Accordingly, for the each data set, the computing module 820 is configured to select the monitoring data that satisfy the first preset condition as the data inspecting group, according to the spatial positions of the sensors corresponding to the monitoring data in the energy-storage battery compartment. The first preset condition is that the spatial distance between said every two of sensors corresponding to the monitoring data is less than the first preset value. Regions where energy-storage modules including sensors are disposed belong to the same monitored region or different monitored regions.

In another possible implementation, the computing module 820 can be further configured to generate at least one distance attenuation model corresponding to at least one training data type, according to a preset training data set and at least one preset distance algorithm corresponding to at least one training data type in the preset training data set. The at least one training data type is identical to the monitoring type.

In another possible implementation, the computing module 820 can be further configured to select a corresponding target distance attenuation model according to a target monitoring type. A training data type corresponding to the target distance attenuation model is identical to the monitoring type. The computing module 820 is configured to input the target monitoring data and the target monitoring type into the target distance attenuation model to obtain a target critical value corresponding to the target monitoring type. The target critical value is related to a distance between the sensor and the monitored object. The computing module 820 is configured to determine the first preset value according to the target critical value.

In yet another possible implementation, the computing module 820 can be further configured to generate a compensation function according to historical data and the distance attenuation model. The historical data are a set of all monitoring data received by a terminal device. For each monitoring data, the computing module 820 can be further configured to generate the compensation coefficient corresponding to the monitoring data, according to the distance between the monitored object and the sensor corresponding to the monitoring data, the monitoring type, and the compensation function.

In yet another possible implementation, the computing module 820 can determine whether blank data is included in the data inspecting group updated is determined. When the blank data is included in the data inspecting group updated, the computing module 820 can be further configured to delete the blank data in the data inspecting group updated to obtain a first data-inspecting-group, and mark a sensor corresponding to the blank data as the target sensor. The blank data may represent monitoring data that is null. The computing module 820 can be further configured to generate first reference data according to an average value of monitoring data in the first data-inspecting-group. When there is first monitoring data whose difference with the first reference data is greater than a second preset value, the computing module 820 can be further configured to mark a sensor corresponding to the first monitoring data as the target sensor.

In yet another possible implementation, when the blank data is not included in the data inspecting group updated, the computing module 820 can be further configured to determine the data inspecting group updated as the first data-inspecting-group, and generate the first reference data according to the average value of the monitoring data in the first data-inspecting-group. When there is the first monitoring data whose difference with the first reference data is greater than the second preset value, the computing module 820 can be further configured to mark the sensor corresponding to the first monitoring data as the target sensor.

In yet another possible implementation, when there is second monitoring data whose difference with the first reference data is greater than a third preset value and less than the second preset value, the computing module 820 can be further configured to mark a sensor corresponding to the second monitoring data as an undermined sensor. The computing module 820 can be further configured to determine whether the undermined sensor is the target sensor according to feedback information sent by sensors and received in a next period.

In yet another possible implementation, when there is the first monitoring data whose difference with the first reference data is greater than the second preset value, the computing module 820 can be further configured to compare the first monitoring data with second reference data in at least one second data-inspecting-group. A spatial distance between an energy-storage module corresponding to the at least one second data-inspecting-group and an energy-storage module corresponding to the first data-inspecting-group is not greater than a fourth preset value. A monitoring type of the at least one second data-inspecting-group is identical to a monitoring type of the first data-inspecting-group. When a difference between the first monitoring data and the second reference data is less than a fifth preset value, the computing module 820 can be further configured to cancel a target sensor mark of the sensor corresponding to the first monitoring data. The fifth preset value is related to the second reference data.

In yet another possible implementation, the computing module 820 can be further configured to generate prompt information according to the target sensor. The display module 830 can be configured to present the prompt information on a terminal device. The prompt information is used for prompting a user to replace or maintain the target sensor.

Figure 9:
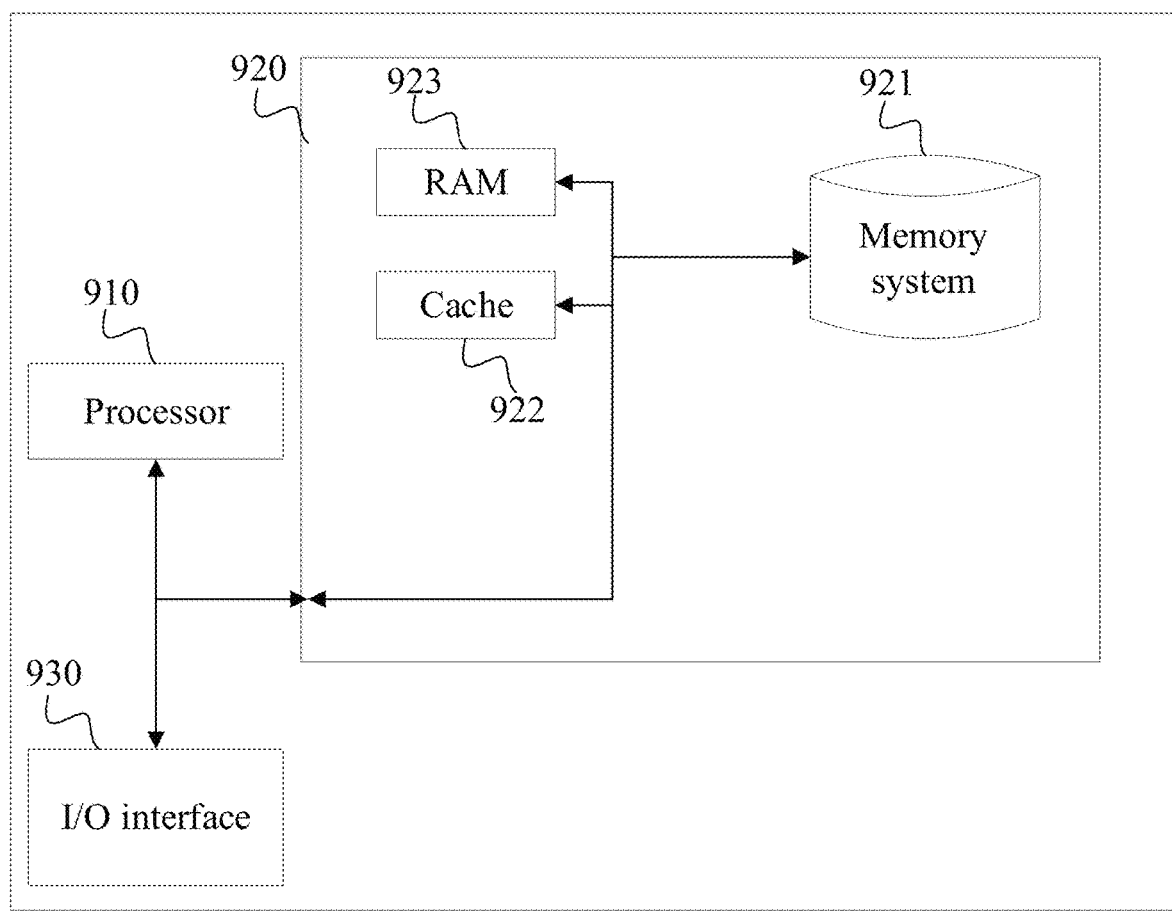
FIG. 9 is a schematic diagram illustrating a composition of a terminal device provided in other implementations of the present disclosure.

Reference is made to FIG. 9, which is a schematic diagram illustrating a composition of a terminal device provided in other implementations of the present disclosure. The terminal device may include a processor 910, a memory 920, an input/output (I/O) interface 930, and a bus. The processor 910, the memory 920, and the I/O interface 930 can be communicatively connected with one another through the bus. The memory 920 is configured to store instructions. The processor 910 is configured to execute the instructions stored in the memory 920 to implement the operations in the method corresponding to FIG. 1, FIG. 3, FIG. 5, FIG. 6, or FIG. 7.

The processor 910 is configured to execute the instructions stored in the memory 920, to control the I/O interface 930 to receive and transmit signals, thereby implementing the operations in the foregoing method. The memory 920 may be integrated in the processor 910, or be disposed separately from the processor 910.

The memory 920 may further include a memory system 921, a cache 922, and a random access memory (RAM) 923. The cache 922 is a single-level-memory existing between the RAM 923 and a central processing unit (CPU), and is consisted of a static random access memory (SRAM). The cache 922 has a relatively small capacity but a speed much higher than that of a main memory, which is close to the speed of the CPU. The RAM 923 is an internal memory for directly exchanging data with the CPU, which can be read and written at any time (except when being refreshed) with a high speed. The RAM 923 is generally used as a temporary data storage medium of an operating system or other running programs. The function of the memory 920 is implemented with a combination of the three.

As an implementation, the function of the I/O interface 930 may be implemented by a transceiver circuit or a dedicated chip for transceiving. The processor 910 may be considered to be implemented by a dedicated processing chip, a processing circuit, a processor, or a general-purpose chip.

As another implementation, the apparatus provided in implementations of the disclosure may be implemented by a general-purpose computer. That is, program codes for implementing functions of the processor 910 and the I/O interface 930 are stored in the memory 920, and a general-purpose processor implements the functions of the processor 910 and the I/O interface 930 by executing the codes in the memory 920.

For explanations and detailed descriptions of the concepts and other operations involved in the apparatus and related to the technical solutions provided in implementations of the disclosure, reference can be made to the description of the foregoing method or the operations in the method performed by the apparatus in other implementations, which are not repeated herein.

As yet another implementation, a non-transitory storage medium is provided, on which instructions are stored. When the instructions are executed, the methods in the foregoing method implementation are executed.

As yet another implementation, a computer program product including instructions is provided, When the instructions are executed, the methods in the foregoing method implementation are executed.

Those of ordinary skill in the art can understand that only one memory and processor are illustrated in FIG. 5 for convenience of illustration. In practice, there may be multiple processors and memories in a terminal or server. The memory can also be referred to as non-transitory storage medium or storage device, etc., which is not limited in implementations of the disclosure.

In implementations of the disclosure, it should be understood that the processor may be a CPU. The processor may also be a general-purpose processor, a digital signal processor (DSP), an application specific integrated circuit (ASIC), a field-programmable gate array (FPGA), or other programming logic devices, discrete gate or transistor logic devices, discrete hardware components, etc.

It should also be understood that, the memory mentioned in implementations of the disclosure may be a volatile memory or a non-volatile memory, or may include both volatile and non-volatile memory. The non-volatile memory may be a read only memory (ROM), a programmable read-only memory (PROM), an erasable programmable read-only memory (EPROM), an electrically erasable programmable read-only memory (EEPROM) or flash memory. The volatile memory may be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM).

It should be noted that, when the processor is a general-purpose processor, DSP, ASIC, FPGA or other programming logic devices, discrete gate or transistor logic devices, or discrete hardware components, the memory (memory module) is integrated in the processor.

It should be noted that, the memory described herein is intended to include, but is not limited to, these and any other suitable types of memory.

In addition to a data bus, the bus may also include a power bus, a control bus, and a status signal buss. However, for the sake of clarity, the various buses are designated as a bus in figure.

It should also be understood that, the first, second, third, fourth and various serial numbers mentioned herein are distinguished merely for the convenience of description and are not intended to limit the scope of the disclosure.

It should be understood that, the term "and/or" herein merely describes an association relationship between associated objects, which means that there may be three relationships. For example, A and/or B may mean A alone, both A and B exist, and B alone. In addition, the character "/" herein generally indicates that the associated objects are in an "or" relationship.

In implementations, each operation in the foregoing method can be completed by hardware integrated logic circuits in the processor and/or instructions in the form of software, and the operations of the method disclosed in implementations of the disclosure can be directly embodied as being completed by a hardware processor or a combination of hardware and software modules in the processor. The software modules may be located in a mature storage medium such as a random access memory, a flash memory, a read-only memory, a programmable read-only memory, or an electrically erasable programmable memory, a register, and the like. The storage medium is located in the memory. The processor reads the information in the memory, and completes the operations of the method described above with the hardware of the processor, which will not be described in detail herein to avoid repetition.

In various implementations of the disclosure, the magnitude of the sequence numbers of the above processes does not mean the order of execution. The order of execution of each process should be determined by its function and internal logic, and should not constitute any limitation to the implementation process of implementations in the disclosure.

Those of ordinary skill in the art will appreciate that, various illustrative logical blocks (ILB) and operations described in connection with implementations disclosed herein can be implemented by electronic hardware or by a combination of computer software and electronic hardware. Whether these functions are performed by means of hardware or software depends on the particular application and the design constraints of the associated technical solution. Those of ordinary skill in the art may use different methods with regard to each particular application to implement the described function, but such implementations should not be considered beyond the scope of the disclosure.

It will be appreciated that the systems, apparatuses, and methods disclosed in some implementations provided in the disclosure may also be implemented in various other manners. For example, the above apparatus implementations are merely illustrative, e.g., the division of units is merely a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of implementations.

Furthermore, various functional units in various implementations of the disclosure may be integrated into one processing unit or may be present as a number of physically separated units, and two or more units may be integrated into one.

All or part of the above implementations can be implemented through software, hardware, firmware, or any other combination thereof. When implemented by software, all or part of the above implementations can be implemented in the form of a computer program product. The computer program product includes one or more computer instructions. When the computer program instructions are loaded and executed on a computer, all or part of the operations or functions described in implementations of the disclosure are generated. The computer may be a general-purpose computer, a special-purpose computer, a computer network, or other programmable apparatuses. The computer instructions may be stored in a storage medium, or transmitted from one storage medium to another storage medium. For example, the computer instruction may be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The storage medium can be any computer accessible usable medium or a data storage device such as a server, a data center, or the like which is integrated with one or more usable medium. The usable medium can be a magnetic medium (such as a soft disc, a hard disc, or a magnetic tape), an optical medium (such as a digital video disc (DVD)), or a semiconductor medium (such as an SSD), etc.

In implementations of the disclosure, a non-transitory storage medium is further provided. The non-transitory storage medium is configured to store a computer program. The computer program is executed by the processor to implement some or all of the operations of any method for troubleshooting the abnormal sensor in the energy-storage apparatus described in the above method implementation.

In implementations of the disclosure, a computer program product is further provided. The computer program product includes a non-transitory storage medium storing a computer program. The computer program is operable to enable the computer to execute some or all of the operations of any method for troubleshooting the abnormal sensor in the energy-storage apparatus described in the above method implementation.

The above are some specific implementations of the disclosure, but the protection scope of the disclosure is not limited thereto. Any changes or substitutions that can be easily conceived by those of ordinary skill in the art within the technical scope disclosed by the disclosure should be covered by the protection scope of the disclosure, and thus the protection scope of the disclosure should be subject to the protection scope of the claims.

What is claimed is:

1. A method for troubleshooting an abnormal sensor in an energy-storage apparatus, comprising:
   receiving, according a preset period, feedback information sent by at least two sensors of at least one type, wherein the feedback information comprises monitoring data and a monitoring type;
   grouping, according to the monitoring type, the monitoring data, wherein one monitoring type corresponds to one data set;
   for each data set,
     selecting, according to position information of sensors corresponding to monitoring data in the data set, monitoring data that satisfy a first preset condition as a data inspecting group, wherein the first preset condition is that a spatial distance between every two of sensors corresponding to the monitoring data in the data set is less than a first preset value;
   for each data inspecting group,
     determining a distance between a monitored object and a sensor corresponding to each monitoring data in the data inspecting group;
     determining, according to the distance between the monitored object and the sensor corresponding to the each monitoring data, a compensation coefficient corresponding to the each monitoring data, wherein the compensation coefficient is positively related to the distance between the monitored object and the sensor corresponding to the each monitoring data;
     compensating, according to the compensation coefficient corresponding to the each monitoring data, the each monitoring data, to obtain a data inspecting group updated; and
     performing data screening on the data inspecting group updated and determining a target sensor, wherein the target sensor is a sensor in a fault state, wherein
     performing the data screening on the data inspecting group updated and determining the target sensor, comprises:
       determining whether blank data is comprised in the data inspecting group updated;
       when the blank data is comprised in the data inspecting group updated, deleting the blank data in the data inspecting group updated to obtain a first data-inspecting-group, and marking a sensor corresponding to the blank data as the target sensor, wherein the blank data represents monitoring data that is null;
       generating first reference data according to an average value of monitoring data in the first data-inspecting-group; and
       when there is first monitoring data whose difference with the first reference data is greater than a second preset value, marking a sensor corresponding to the first monitoring data as the target sensor.

2. The method of claim 1, applied to a scenario where firefighting detection of an energy-storage battery compartment is abnormal, wherein the energy-storage battery compartment comprises a plurality of energy-storage modules and a plurality of types of sensors, wherein
   the monitoring type comprises at least one of a gas composition, a gas concentration, a temperature, a pressure, a voltage, or a creep distance;
   the position information of the sensors is spatial positions of the sensors in the energy-storage battery compartment;

a monitored region of the sensor is a region where an energy-storage module comprising the sensor is disposed;
the monitored object is the energy-storage module; and
accordingly, for the each data set, the method comprises:
selecting, according to the spatial positions of the sensors corresponding to the monitoring data in the energy-storage battery compartment, the monitoring data that satisfy the first preset condition as the data inspecting group, wherein the first preset condition is that the spatial distance between said every two of sensors corresponding to the monitoring data is less than the first preset value.

3. The method of claim 2, further comprising:
generating at least one distance attenuation model corresponding to at least one training data type, according to a preset training data set and at least one preset distance algorithm corresponding to at least one training data type in the preset training data set, wherein the at least one training data type is identical to the monitoring type.

4. The method of claim 3, wherein selecting, according to the position information of the sensors corresponding to the monitoring data in the data set, the monitoring data that satisfy the first preset condition as the data inspecting group, comprises:
selecting a corresponding target distance attenuation model according to a target monitoring type, wherein a training data type corresponding to the target distance attenuation model is identical to the target monitoring type;
inputting the target monitoring type and target monitoring data corresponding to the target monitoring type into the target distance attenuation model to obtain a target critical value corresponding to the target monitoring type, wherein the target critical value is related to a distance between the sensor and the monitored object; and
determining the first preset value according to the target critical value.

5. The method of claim 4, wherein determining, according to the distance between the monitored object and the sensor corresponding to the each monitoring data, the compensation coefficient corresponding to the each monitoring data, comprises:
generating, according to historical data and the distance attenuation model, a compensation function, wherein the historical data are a set of all monitoring data received by a terminal device; and
for each monitoring data, generating, according to the distance between the monitored object and the sensor corresponding to the monitoring data, the monitoring type, and the compensation function, the compensation coefficient corresponding to the monitoring data.

6. The method of claim 5, wherein after determining whether the blank data is comprised in the data inspecting group updated, the method further comprises:
when the blank data is not comprised in the data inspecting group updated, determining the data inspecting group updated as the first data-inspecting-group, and generating the first reference data according to the average value of the monitoring data in the first data-inspecting-group; and
when there is the first monitoring data whose difference with the first reference data is greater than the second preset value, marking the sensor corresponding to the first monitoring data as the target sensor.

7. The method of claim 6, wherein when there is the first monitoring data whose difference with the first reference data is greater than the second preset value, marking the sensor corresponding to the first monitoring data as the target sensor, comprises:
when there is second monitoring data whose difference with the first reference data is greater than a third preset value and less than the second preset value, marking a sensor corresponding to the second monitoring data as an undermined sensor; and
determining, according to feedback information sent by sensors and received in a next period, whether the undermined sensor is the target sensor.

8. The method of claim 6, wherein when there is the first monitoring data whose difference with the first reference data is greater than the second preset value, marking the sensor corresponding to the first monitoring data as the target sensor, comprises:
when there is the first monitoring data whose difference with the first reference data is greater than the second preset value, comparing the first monitoring data with second reference data in at least one second data-inspecting-group, wherein a spatial distance between an energy-storage module corresponding to the at least one second data-inspecting-group and an energy-storage module corresponding to the first data-inspecting-group is not greater than a fourth preset value, a monitoring type of the at least one second data-inspecting-group is identical to a monitoring type of the first data-inspecting-group; and
when a difference between the first monitoring data and the second reference data is less than a fifth preset value, canceling a target sensor mark of the sensor corresponding to the first monitoring data, wherein the fifth preset value is related to the second reference data.

9. The method of claim 1, wherein after performing the data screening on the data inspecting group updated and determining the target sensor, the method further comprises:
generating, according to the target sensor, prompt information, and presenting the prompt information on a terminal device, wherein the prompt information is used for prompting a user to replace or maintain the target sensor.

10. A terminal device, comprising:
a processor, a memory, and a bus, wherein the processor is connected with the memory through the bus, the memory is configured to store a set of program codes, and the processor is configured to invoke the program codes stored in the memory to execute:
receiving, according a preset period, feedback information sent by at least two sensors of at least one type, wherein the feedback information comprises monitoring data and a monitoring type;
grouping, according to the monitoring type, the monitoring data, wherein one monitoring type corresponds to one data set;
for each data set,
selecting, according to position information of sensors corresponding to monitoring data in the data set, monitoring data that satisfy a first preset condition as a data inspecting group, wherein the first preset condition is that a spatial distance between every two of sensors corresponding to the monitoring data in the data set is less than a first preset value;
for each data inspecting group, determining a distance between a monitored object and a sensor corresponding to each monitoring data in the data inspecting group;

determining, according to the distance between the monitored object and the sensor corresponding to the each monitoring data, a compensation coefficient corresponding to the each monitoring data, wherein the compensation coefficient is positively related to the distance between the monitored object and the sensor corresponding to the each monitoring data;

compensating, according to the compensation coefficient corresponding to the each monitoring data, the each monitoring data, to obtain a data inspecting group updated; and performing data screening on the data inspecting group updated and determining a target sensor, wherein the target sensor is a sensor in a fault state, wherein performing the data screening on the data inspecting group updated and determining the target sensor, comprises:

determining whether blank data is comprised in the data inspecting group updated;

when the blank data is comprised in the data inspecting group updated, deleting the blank data in the data inspecting group updated to obtain a first data-inspecting-group, and marking a sensor corresponding to the blank data as the target sensor, wherein the blank data represents monitoring data that is null;

generating first reference data according to an average value of monitoring data in the first data-inspecting-group; and when there is first monitoring data whose difference with the first reference data is greater than a second preset value, marking a sensor corresponding to the first monitoring data as the target sensor.

11. The terminal device of claim 10, applied to a scenario where firefighting detection of an energy-storage battery compartment is abnormal, wherein the energy-storage battery compartment comprises a plurality of energy-storage modules and a plurality of types of sensors, wherein the monitoring type comprises at least one of a gas composition, a gas concentration, a temperature, a pressure, a voltage, or a creep distance;

the position information of the sensors is spatial positions of the sensors in the energy-storage battery compartment;

a monitored region of the sensor is a region where an energy-storage module comprising the sensor is disposed;

the monitored object is the energy-storage module; and accordingly, for the each data set, the processor is further configured to invoke the program codes stored in the memory to execute:

selecting, according to the spatial positions of the sensors corresponding to the monitoring data in the energy-storage battery compartment, the monitoring data that satisfy the first preset condition as the data inspecting group, wherein the first preset condition is that the spatial distance between said every two of sensors corresponding to the monitoring data is less than the first preset value.

12. The terminal device of claim 11, wherein the processor is further configured to invoke the program codes stored in the memory to execute:

generating at least one distance attenuation model corresponding to at least one training data type, according to a preset training data set and at least one preset distance algorithm corresponding to at least one training data type in the preset training data set, wherein the at least one training data type is identical to the monitoring type.

13. The terminal device of claim 12, wherein in terms of selecting, according to the position information of the sensors corresponding to the monitoring data in the data set, the monitoring data that satisfy the first preset condition as the data inspecting group, the processor is configured to invoke the program codes stored in the memory to execute:

selecting a corresponding target distance attenuation model according to a target monitoring type, wherein a training data type corresponding to the target distance attenuation model is identical to the target monitoring type;

inputting the target monitoring type and target monitoring data corresponding to the target monitoring type into the target distance attenuation model to obtain a target critical value corresponding to the target monitoring type, wherein the target critical value is related to a distance between the sensor and the monitored object; and determining the first preset value according to the target critical value.

14. The terminal device of claim 13, wherein in terms of determining, according to the distance between the monitored object and the sensor corresponding to the each monitoring data, the compensation coefficient corresponding to the each monitoring data, the processor is configured to invoke the program codes stored in the memory to execute:

generating, according to historical data and the distance attenuation model, a compensation function, wherein the historical data are a set of all monitoring data received by a terminal device; and for each monitoring data, generating, according to the distance between the monitored object and the sensor corresponding to the monitoring data, the monitoring type, and the compensation function, the compensation coefficient corresponding to the monitoring data.

15. The terminal device of claim 14, wherein after determining whether the blank data is comprised in the data inspecting group updated, the processor is further configured to invoke the program codes stored in the memory to execute:

when the blank data is not comprised in the data inspecting group updated, determining the data inspecting group updated as the first data-inspecting-group, and generating the first reference data according to the average value of the monitoring data in the first data-inspecting-group; and when there is the first monitoring data whose difference with the first reference data is greater than the second preset value, marking the sensor corresponding to the first monitoring data as the target sensor.

16. The terminal device of claim 15, wherein in terms of when there is the first monitoring data whose difference with the first reference data is greater than the second preset value, marking the sensor corresponding to the first monitoring data as the target sensor, the processor is configured to invoke the program codes stored in the memory to execute:

when there is second monitoring data whose difference with the first reference data is greater than a third preset value and less than the second preset value, marking a sensor corresponding to the second monitoring data as an undermined sensor; and determining, according to feedback information sent by sensors and received in a next period, whether the undermined sensor is the target sensor.

17. The terminal device of claim 15, wherein in terms of when there is the first monitoring data whose difference with the first reference data is greater than the second preset value, marking the sensor corresponding to the first monitoring data as the target sensor, the processor is configured to invoke the program codes stored in the memory to execute:

when there is the first monitoring data whose difference with the first reference data is greater than the second preset value, comparing the first monitoring data with second reference data in at least one second data-inspecting-group, wherein a spatial distance between an energy-storage module corresponding to the at least one second data-inspecting-group and an energy-storage module corresponding to the first data-inspecting-group is not greater than a fourth preset value, a monitoring type of the at least one second data-inspecting-group is identical to a monitoring type of the first data-inspecting-group; and when a difference between the first monitoring data and the second reference data is less than a fifth preset value, canceling a target sensor mark of the sensor corresponding to the first monitoring data, wherein the fifth preset value is related to the second reference data.

18. The terminal device of claim 10, wherein after performing the data screening on the data inspecting group updated and determining the target sensor, the processor is further configured to invoke the program codes stored in the memory to execute:

generating, according to the target sensor, prompt information, and presenting the prompt information on a terminal device, wherein the prompt information is used for prompting a user to replace or maintain the target sensor.

19. A non-transitory storage medium coupled to a computer and storing instructions which, when executed by the computer, implement:

receiving, according a preset period, feedback information sent by at least two sensors of at least one type, wherein the feedback information comprises monitoring data and a monitoring type;

grouping, according to the monitoring type, the monitoring data, wherein one monitoring type corresponds to one data set;

for each data set,
  selecting, according to position information of sensors corresponding to monitoring data in the data set, monitoring data that satisfy a first preset condition as a data inspecting group, wherein the first preset condition is that a spatial distance between every two of sensors corresponding to the monitoring data in the data set is less than a first preset value;

for each data inspecting group,
  determining a distance between a monitored object and a sensor corresponding to each monitoring data in the data inspecting group;
  determining, according to the distance between the monitored object and the sensor corresponding to the each monitoring data, a compensation coefficient corresponding to the each monitoring data, wherein the compensation coefficient is positively related to the distance between the monitored object and the sensor corresponding to the each monitoring data;

compensating, according to the compensation coefficient corresponding to the each monitoring data, the each monitoring data, to obtain a data inspecting group updated; and performing data screening on the data inspecting group updated and determining a target sensor, wherein the target sensor is a sensor in a fault state, wherein performing the data screening on the data inspecting group updated and determining the target sensor, comprises:

determining whether blank data is comprised in the data inspecting group updated;

when the blank data is comprised in the data inspecting group updated, deleting the blank data in the data inspecting group updated to obtain a first data-inspecting-group, and marking a sensor corresponding to the blank data as the target sensor, wherein the blank data represents monitoring data that is null;

generating first reference data according to an average value of monitoring data in the first data-inspecting-group; and when there is first monitoring data whose difference with the first reference data is greater than a second preset value, marking a sensor corresponding to the first monitoring data as the target sensor.

20. The non-transitory storage medium of claim 19, applied to a scenario where firefighting detection of an energy-storage battery compartment is abnormal, wherein the energy-storage battery compartment comprises a plurality of energy-storage modules and a plurality of types of sensors, wherein the monitoring type comprises at least one of a gas composition, a gas concentration, a temperature, a pressure, a voltage, or a creep distance;

the position information of the sensors is spatial positions of the sensors in the energy-storage battery compartment;

a monitored region of the sensor is a region where an energy-storage module comprising the sensor is disposed;

the monitored object is the energy-storage module; and accordingly, for the each data set, the instructions which, when executed by the computer, further implement:

selecting, according to the spatial positions of the sensors corresponding to the monitoring data in the energy-storage battery compartment, the monitoring data that satisfy the first preset condition as the data inspecting group, wherein the first preset condition is that the spatial distance between said every two of sensors corresponding to the monitoring data is less than the first preset value.

* * * * *